Dec. 15, 1931.  H. KÜCHENMEISTER  1,836,124
FILM FOR PHONOGRAPHIC RECORDS
Original Filed Oct. 29, 1927

Patented Dec. 15, 1931

1,836,124

UNITED STATES PATENT OFFICE

HEINRICH KÜCHENMEISTER, OF BERLIN, GERMANY

FILM FOR PHONOGRAPHIC RECORDS

Original application filed October 29, 1927, Serial No. 229,758, and in Germany November 2, 1926. Divided and this application filed February 26, 1929. Serial No. 342,775.

My invention relates to films for phonographic records and it is an object of my invention to provide a film of narrow width which is exclusively provided with sound curves. This application is a division of my copending application, Serial No. 229,758, filed October 29th, 1927.

It has already been proposed to provide phonographic records on picture films with the object of simultaneous reproduction in a comparatively simple manner but the space for the phonographic records is much restricted by the large pictures. It has also been proposed to provide films exclusively with phonographic records but such films though of normal width were so-called "endless" films which have the drawback that their length is much restricted and that it is not possible to connect several such films by pasting them together. My films, on the other hand, are of "finite" length.

In order not only to save material but also to simplify the rendering and to reduce its cost, the film which according to my invention is provided only with phonographic records, is made much narrower than in the commercial films. This involves a corresponding simplification and reduction of cost in the means for feeding the film. As, furthermore, in my invention the film is fed not intermittently but continuously, the feeding appliances are much simplified. Narrow films have already been proposed but exclusively for pictures but these are fed intermittently. In contradistinction, in my invention I may utilize the edge of the plate record of a talking machine, for instance, as the means for feeding the film. With a film having pictures as well as phonographic records, or a film of normal width, this would obviously be impracticable.

By providing only phonographic records on the films, the further important advantage is obtained that notwithstanding the narrowness of the bands it is possible to arrange a considerable number of records in proximity. Such records may be taken of the same piece of music but separately of the several instruments, for instance, the wind and chord instruments of a band and to amplify the records to various extents in order to make up for certain defects of the recording method. Besides, the several records may be dephased.

In order to provide positive engagement of the film and the feeding means I may provide central perforations or serrations at one or either edge of the film. In the case of central perforations records may be made at either side of the row of perforations.

In the accompanying drawings several films embodying my invention are illustrated by way of example.

Figure 1:
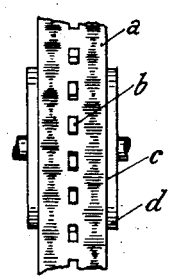
Fig. 1 shows a film having central perforations and straight edges.

Referring now to the drawings, and first to Fig. 1, $a$ is a film, $b$ are central perforations in the film adapted to be engaged by teeth on the roller $d$, or by any other suitable means as pins or the like, $c$, $c$ are the edges of the film which are plain, as well as the shrouds on the roller, and the records at either side of the perforations $b$ are indicated by parallel hatching.

Figure 2:
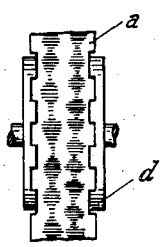
Fig. 2 shows a film having serrated edges.

Referring to Fig. 2, the film $a$ has serrated edges, and the shrouds on the roller $d$ are serrated in conformity.

Figure 3:
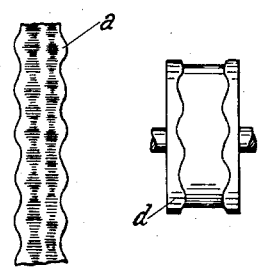
Fig. 3 shows a film having corrugated edges, with the feeding roller pertaining thereto.

Referring to Fig. 3, the edges of the film are corrugated, and so are the shrouds of the roller $d$.

Figure 4:
Fig. 4 shows a film as in Fig. 3 having only one record and correspondingly reduced width.

The films shown in the preceding figures have each two records which may be identical but dephased. Fig. 4 shows a film of minimum width with only a single record.

I claim:

A flexible sound record comprising a narrow film of uniform width and finite length with but a single row of perforations, said perforations being located substantially along the center line of said film and a separate photographical sound record on each side of said row of perforations.

In testimony whereof I affix my signature.

HEINRICH KÜCHENMEISTER.